(12) United States Patent
Hicok

(10) Patent No.: US 7,010,724 B1
(45) Date of Patent: Mar. 7, 2006

(54) OPERATING SYSTEM HANG DETECTION AND METHODS FOR HANDLING HANG CONDITIONS

(75) Inventor: Gary D. Hicok, Mesa, AZ (US)

(73) Assignee: Nvidia Corporation, Santa Clara, CA (US)

( * ) Notice: Subject to any disclaimer, the term of this patent is extended or adjusted under 35 U.S.C. 154(b) by 494 days.

(21) Appl. No.: 10/164,456

(22) Filed: Jun. 5, 2002

(51) Int. Cl.
G06F 11/00 (2006.01)
(52) U.S. Cl. .......................................... 714/39; 714/55
(58) Field of Classification Search .................. 714/36, 714/38, 51, 55, 39
See application file for complete search history.

(56) References Cited

U.S. PATENT DOCUMENTS

| | | | | |
|---|---|---|---|---|
| 4,627,060 A | * | 12/1986 | Huang et al. .................. 714/36 |
| 4,956,842 A | * | 9/1990 | Said ............................ 714/815 |
| 5,944,840 A | * | 8/1999 | Lever ........................... 714/34 |
| 6,112,320 A | * | 8/2000 | Dien ............................ 714/51 |
| 6,587,966 B1 | * | 7/2003 | Chaiken et al. ............... 714/34 |
| 6,606,716 B1 | * | 8/2003 | Vrhel et al. ................... 714/32 |
| 6,665,758 B1 | * | 12/2003 | Frazier et al. ............... 710/200 |
| 6,711,700 B1 | * | 3/2004 | Armstrong et al. ........... 714/23 |
| 2001/0042198 A1 | * | 11/2001 | Poisner .......................... 713/2 |
| 2003/0084381 A1 | * | 5/2003 | Gulick ......................... 714/47 |

* cited by examiner

Primary Examiner—Scott Baderman
Assistant Examiner—Joshua Lohn
(74) Attorney, Agent, or Firm—Wagner, Murabito & Hao LLP (57) ABSTRACT

Circuitry for detecting operating system hang conditions is provided. The circuitry includes interrupt logic for receiving system interrupts targeted for a central processing unit. Further included is hang detection logic that is in communication with the interrupt logic. The hang detection logic is capable of determining whether the central processing unit has processed an interrupt within a period of time. Hang resolution logic is further provided for removing the central processing unit from a hang state when it is determined that the interrupt has not been processed within the period of time.

26 Claims, 7 Drawing Sheets

OPERATING SYSTEM HANG DETECTION AND METHODS FOR HANDLING HANG CONDITIONS

BACKGROUND OF THE INVENTION

1. Field of the Invention

This invention relates generally to hardware implemented to detect hang conditions of an operating system (OS), and more particularly, detection logic used to monitor interrupt handling by the operating system, and actively initiating processes to remove the operating system from a detected OS hang condition.

2. Description of the Related Art

As is well known, computer systems are continually being pushed to achieve higher and higher performance levels. To achieve even higher performance, some users modify settings to increase clock speeds and operating voltage settings. In some cases, users attach peripheral device cards to the system in order to enable high performance applications, such as graphics intensive game applications and other applications that will push the system to its highest operating stress.

Currently, boot detection logic code is implemented as part of the Basic Input/Output System (BIOS). This boot detection logic code is designed to test whether the computer system can handle operation under its current configuration. To accomplish this test, the hardware uses a counter. At the start of the boot sequence, a bit in the counter is set. If the bit is not cleared by the BIOS after a certain amount of time has elapsed, the hardware will assume that the system is in a hung state and reset the system. To a user, a hung state is when the computer stops responding or otherwise freezes.

Unfortunately, the boot detection logic code only tests the system before the operating system (OS) loads, and thus, the system will not be tested under the more stressful conditions described above. Consequently, prior art processes used to detect whether a computer system will hang will most likely not be an effective forecaster of potential hangs by the OS during high performance processing.

In view of the forgoing, there is a need for computer hardware to detect when the OS has entered a hung state, and hardware and software to assist in automatic recovery of the computer system to a more optimal operational state.

SUMMARY OF THE INVENTION

In one embodiment, circuitry for detecting operating system hang conditions is disclosed. The circuitry includes interrupt logic for receiving system interrupts (e.g., also known as events) targeted for a central processing unit. Further included is hang detection logic that is in communication with the interrupt logic. The hang detection logic is capable of determining whether the central processing unit has processed an interrupt within a period of time. Hang resolution logic is further provided for removing the central processing unit from a hang state when it is determined that the interrupt has not been processed within the period of time.

In another embodiment, a computer system is provided having a central processing unit, a north bridge, a south bridge, random access memory, and a system BIOS. Hang detect circuitry is integrated into the south bridge for monitoring when the central processing unit enters a hang state. The hang detect circuitry includes interrupt logic for handling interrupts for the computer system and communicating the received interrupts to the central processing unit. Hang detection logic is further provided for monitoring a period of time for which interrupts are processed by the operating system and determining when a hang state has occurred. The hang detect circuitry further includes hang resolution logic for recovering the operating system from the hang state.

In yet another embodiment, a method for detecting when an operating system enters a hang state is disclosed. The method includes monitoring interrupts to the operating system, and timing each interrupt to determine if the hang state has occurred. If a period of time expires without completion of an interrupt, the method further includes initiating a recovery process to remove the operating system from the hang state.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for hardware and software for detecting and handling states in which a computer system hangs while the system is in full operating system operation. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As a high level overview of the one embodiment of the present invention, hardware and software is provided to give computer users a better experience by detecting and handling situations in which the operating system (OS) enters a hung state. Typically computing systems use interrupts (INTR) to monitor status and provide events. In operation, interrupts are occurring constantly in any full OS and are generally considered high priority events that need to be processed. Upon receiving an interrupt, the central processing unit's (CPU's) current thread of operation is suspended and the interrupt is quickly processed. The current thread is put into a priority queue for later processing (if applicable). In one embodiment of the present invention, interrupts to the CPU will be monitored to determine if interrupts are not serviced within a reasonable amount of time. The time period is programmable (e.g., a preset time period), depending on the particular system. By monitoring this time period, it can be determined whether the OS has hung and processing has stopped. Hardware can then employ other processes to gain control of the system. The processes can, in one embodiment, be escalated according to a pre-programmed priority scale, in which different techniques are attempted until last resort operations are used to reset a system. An exemplary priority scale for a PC computing system may be to first attempt a Non-Maskable Interrupt (NMI#), then a System Management Interrupt (SMI#), then a CPU Init (INIT), and then finally a full system reset.

By using an escalated technique, it is possible to give the BIOS a chance to first try to "detect" what has happened and fix the problem if possible. If the problem cannot be fixed, the process will allow the BIOS (e.g., system software (SW)) to recommend new settings to the user when the system reboots. Additionally, system SW (BIOS) can track the frequency and type of events to determine if the system has a hardware stability issue or a software induced condition. In a specific embodiment, if the particular OS allows, the operating system's self diagnostic programs can be automatically launched and initiated, or other programs can be pre-configured to be launched to handle particular issues.

Figure 1:
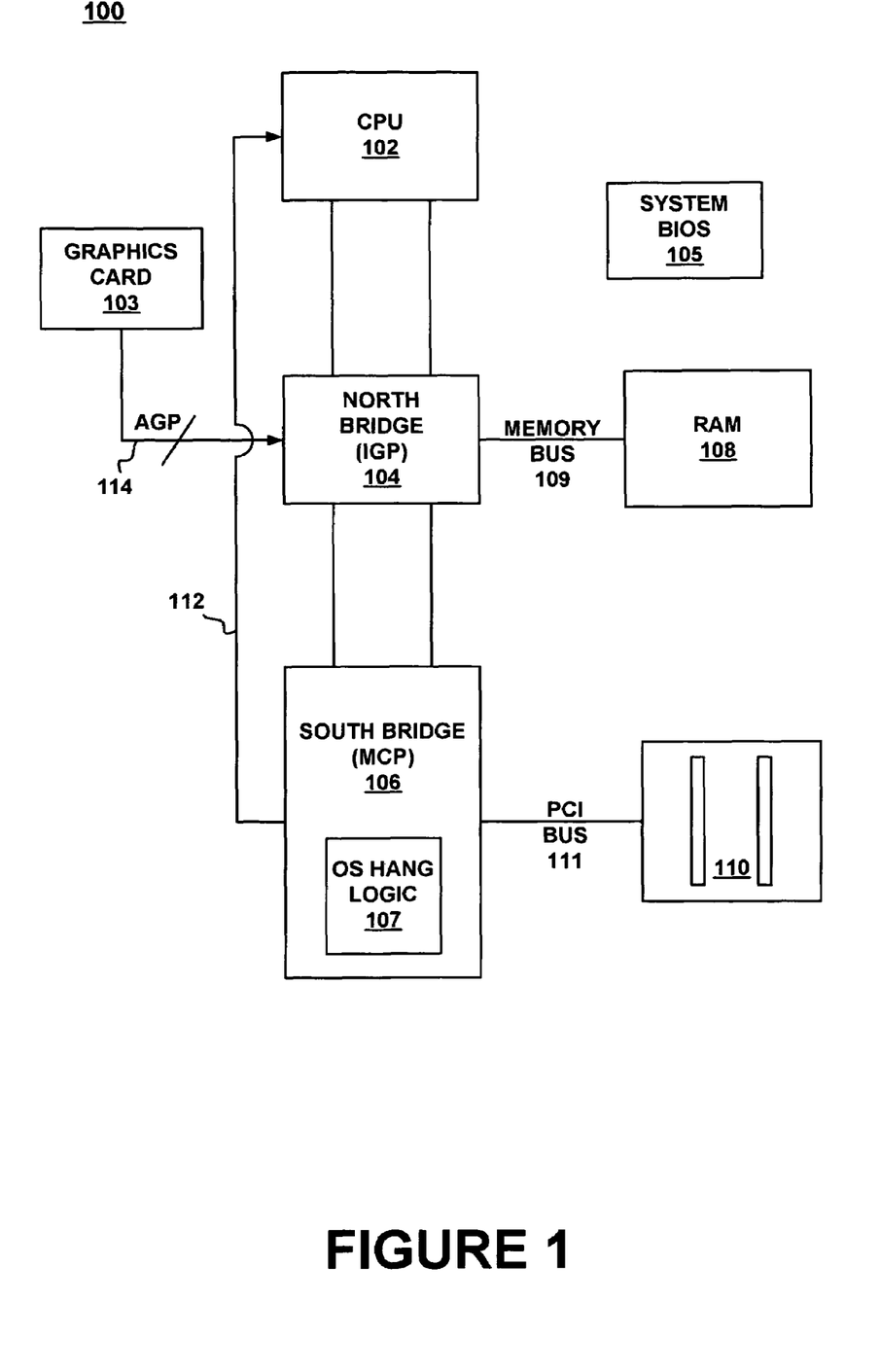
FIG. 1 illustrates a block diagram of a computer system having OS hang logic, in accordance with one embodiment of the present invention.

With this high level overview in mind, reference is now drawn to FIG. 1, which illustrates a block diagram of a computer system 100 chip layout, in accordance with one embodiment of the present invention. As shown, the computer system 100 includes a central processing unit (CPU) 102, a north bridge 104, and a south bridge 106. In one embodiment, the north bridge 104 can also function as an integrated graphics processor (IGP). The north bridge 104 therefore couples to graphics cards 103 by way of an accelerated graphics port (AGP) bus 114. The north bridge 104 is also shown coupled to random access memory (RAM) 108 by way of a memory bus 109. The south bridge 106 is shown coupled to Peripheral Component Interconnect (PCI) slots 110 by way of a PCI bus 111.

In one embodiment, the south bridge 106 can be a media communications processor (MCP). The south bridge 106 is configured to handle all of the IO bus interfacing for a particular system. Accordingly, the south bridge 106 may also include networked interface circuitry for communicating to a network, such as a local area network and the Internet, connections to other peripheral devices, etc. The computer system 100 also includes a system basic input/output system (BIOS) 105 for controlling the boot sequences and other system functions of the computer system 100.

In accordance with one embodiment of the present invention, the south bridge 106 will include OS hang logic 107. The OS hang logic 107 will interface with the CPU 102 by way of a communication link 112. The OS hang logic 107, as mentioned above, is designed to monitor whether interrupts are being processed within a period of time by the CPU 102. If interrupts are not being handled by the CPU 102 within a set period of time, the OS hang logic 107 will detect that the operating system has entered a hung state. Once it is determined that the operating system has entered a hung state, the OS hang logic 107 will attempt to remove the OS from the hung state using one or more escalating recovery processes.

Figure 2:
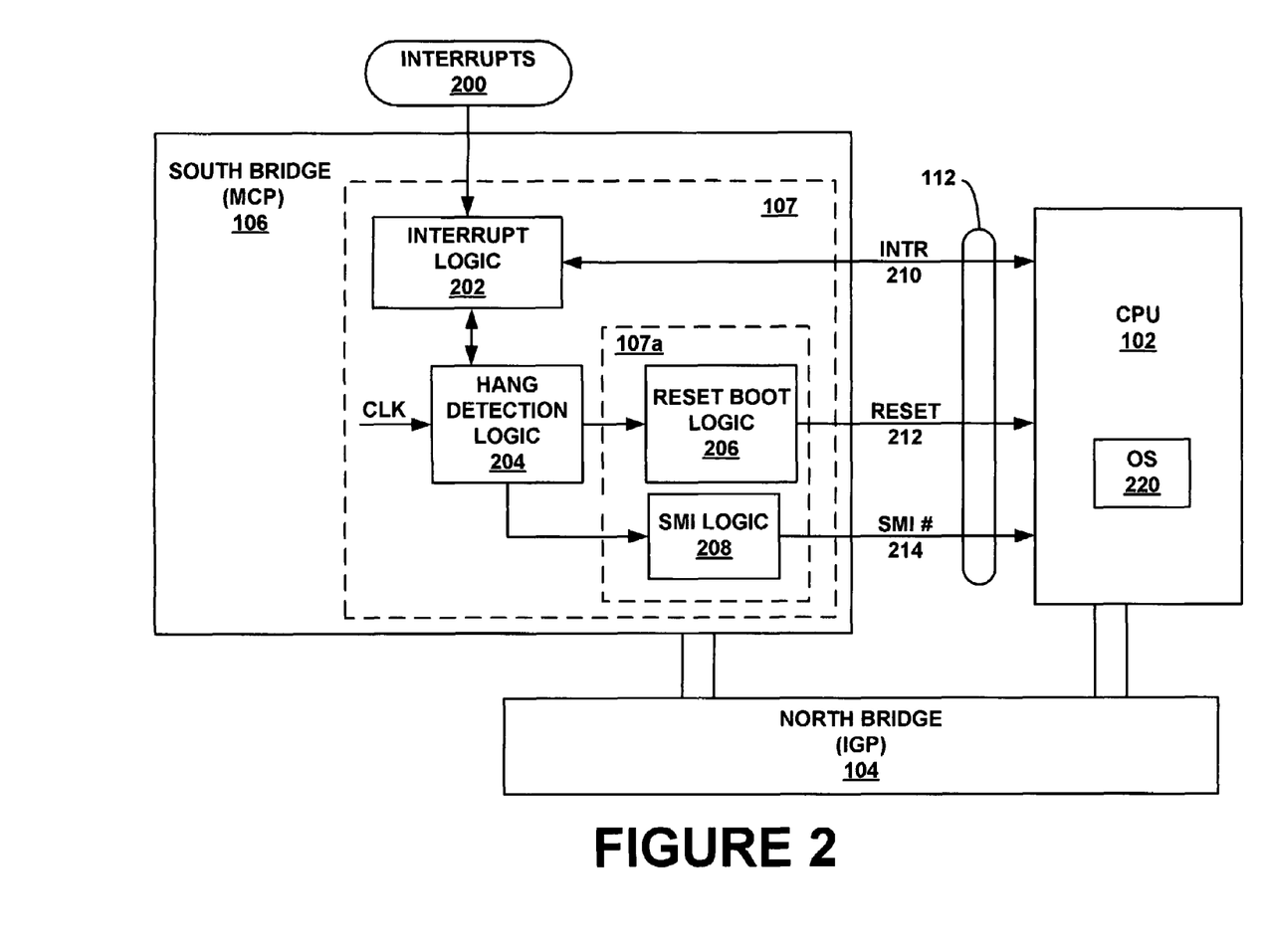
FIG. 2 illustrates a more detailed diagram of the south bridge, and circuitry associated with the OS hang logic, in accordance with one embodiment of the present invention.

FIG. 2 illustrates a more detailed diagram of the south bridge 106, and circuitry associated with the OS hang logic 107. As shown, the OS hang logic 107 includes interrupt logic 202, hang detection logic 204, and hang resolution logic 107a. In one exemplary embodiment, hang resolution logic 107a includes reset boot logic 206 and system management interrupt (SMI) logic 108. As shown, hang detection logic 204 is in communication with the interrupt logic 202 and receives a clock (CLK) signal from the system.

SMI is non-maskable higher priority interrupt method that can be used to perform system management functions independent of processor operating mode (e.g., Real, Protected, or Virtual 8086 modes, etc.). In one embodiment, activating the SMI invokes a sequence that saves the operating state of the processor into a separate memory address space, independent of the main system memory. After the state is saved, the processor is forced into System Management Mode and begins execution out of a separate System Management address space that BIOS code is loaded into at boot time. As will be described below, the BIOS code will preferably operate to trouble shoot the condition that caused the OS to hang, and invoke a number of system processes to correct the condition.

The hang detection logic 204 is further shown coupled to each of the reset boot logic 206 and the SMI logic 208. In one embodiment, the SMI logic 208 can be referred to as "first corrective" logic and the reset boot logic 206 can be referred to as "second corrective" logic, since generally it will be preferred that an SMI be attempted before a reset. The reset boot logic 206 is shown in communication with the CPU 102 by way of a reset signal 212. The interrupt logic 202 is coupled to the CPU 102 by way of an interrupt line 210, and the SMI logic 208 is coupled to the CPU by way of an SMI# 214 line. Further illustrated is the south bridge 106 being coupled to the north bridge 104, and the north bridge 104 being coupled to the CPU 102. Upon boot-up of the computer system 100, the CPU 102 will be running the operating system 220.

During normal operation, interrupts 200 are being processed by the operating system 220, and interrupts 200 are being communicated by way of the interrupt logic 202 of the south bridge 106. The hang detection logic 204 will include a timer that monitors interrupts 200 being handled by the interrupt logic 202. The hang detection logic 204 by way of the timer, will determine whether a period of time has expired from when an interrupt 200 was issued to the operating system 220. If the period of time expires as determined by the hang detection logic 204, it will be assumed that the operating system 220 has entered a hang state.

As mentioned above, a hang state is when the computer system will freeze up and the operating system fails to process a current interrupt. Because an interrupt is designed to take control of the operating system in favor of a current process tread (e.g., task), the unprocessed interrupt will cause the computer system to freeze, and thus, enter the hang state. When the hang detection logic 204 determines that the hang state has occurred, the hang detection logic 204 will initiate procedures for removing the OS 220 from the hang state. In one embodiment, depending upon the settings of particular registers that control the hang detection logic 204, the hang detection logic 204 will attempt one of two procedures for removing the OS 220 from the hang state.

Assuming that registers are set so as to first attempt first corrective logic procedures through the SMI logic 208, the hang detection logic 204 will pass control to SMI logic 208 which will provide an SMI signal 214 to the operating system 220. As mentioned above, an SMI signal is a non-maskable and higher priority interrupt that takes control of the operating system. The operating system is then instructed to pass control to software that is part of the system BIOS.

In one embodiment, the system BIOS will be programmed with code for attempting a fix of the problem that caused the OS 220 to hang. If the BIOS code is not able to fix the problem, the BIOS code can recommend a new setting for the user to attempt when the system re-boots. In addition, the system BIOS code can track the frequency and types of events to determine if the system has a hardware stability issue or a software-induced condition. If the OS 220 allows, the system BIOS can instruct the launching of operating system self-diagnostic programs. If resolution of the hang state by the SMI logic 208 fails, the hang detection logic 204 will instruct that resolution of the hang state be attempted through other process operations.

In one example, the hang detection logic 204 can instruct a non-maskable interrupt (NMI#), a CPU (INIT), a full system reset using the reset boot logic 206, etc. If the reset boot logic 206 is selected based on register settings, the reset boot logic 206 will initiate a reset 212 to the operating system 220, and in one embodiment also set a flag. The system will then be caused to re-boot, and the system BIOS will be directed to read the flag. In one embodiment, the flag will instruct the system to return system settings back to default (or safe settings) system settings to prevent future instabilities. For example, the system may have been run in an over-clocked state, an over-voltage state, or in another state that caused higher stress than the system can withstand for normal OS operation. As a result, the system will reset itself back to a lower clock speed, lower voltage setting, and/or other safe settings so as to prevent future system instabilities.

Figure 3A:
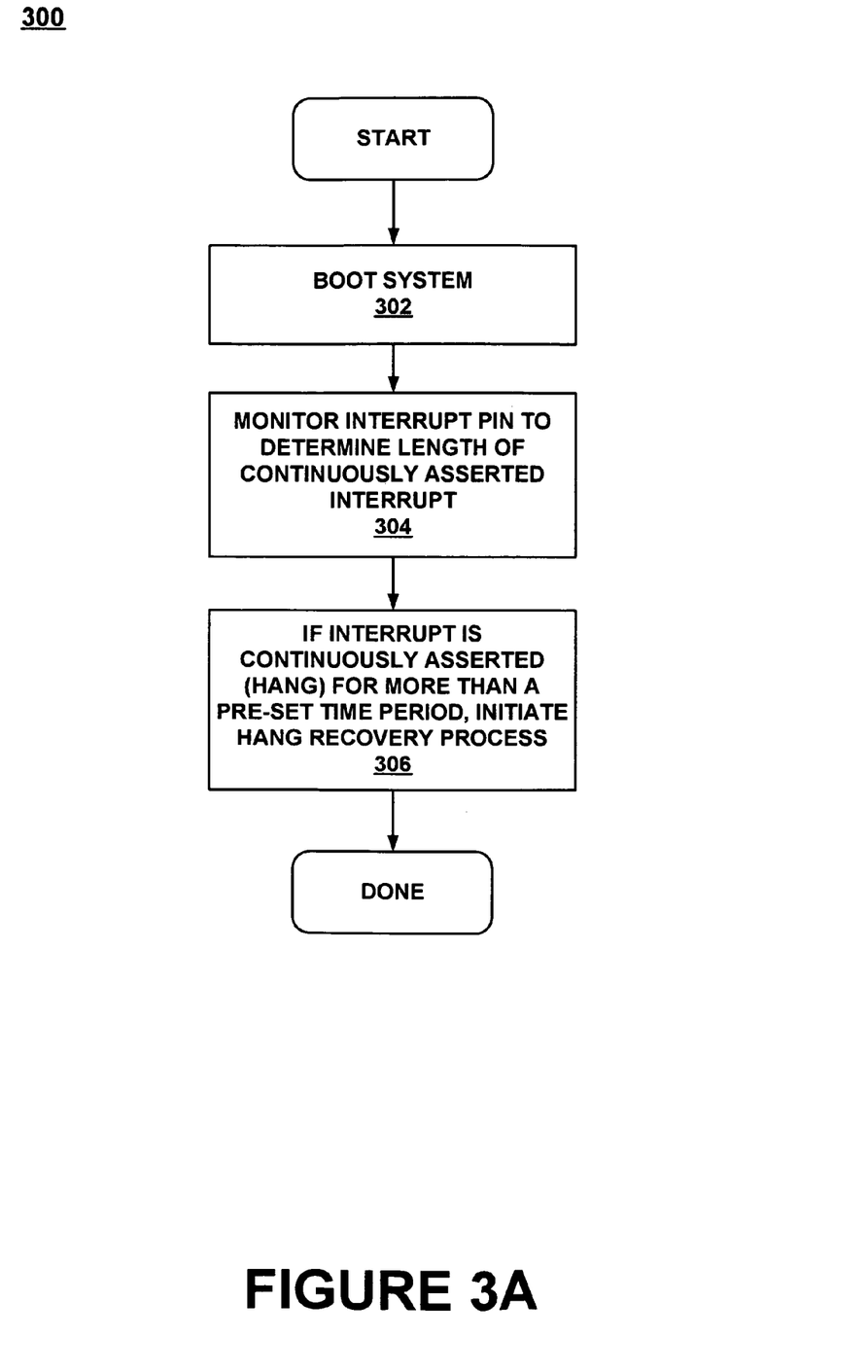
FIG. 3A illustrates a flowchart diagram for monitoring continuously asserted interrupts and initiating hang recovery processes, in accordance with one embodiment of the present invention.

FIG. 3A illustrates a flowchart diagram 300 for monitoring continuously asserted interrupts and initiating hang recovery processes, in accordance with one embodiment of the present invention. The method begins at operation 302 where the system is booted. Once the system is booted and the BIOS has completed its task, the operating system will take over and enable the user to process applications.

During processing by the operating system, an interrupt pin is monitored at operation 304 to determine the length of continuously asserted interrupts to the operating system. In operation 306, if it is determined that the interrupt is continuously asserted for more than a preset time period (e.g., 2 seconds, 4 seconds, 8 seconds, 16 seconds, 32 seconds, etc.—programmable), a hang recovery process will be initiated to remove the operating system from the hang state in operation 306.

Figure 3B:
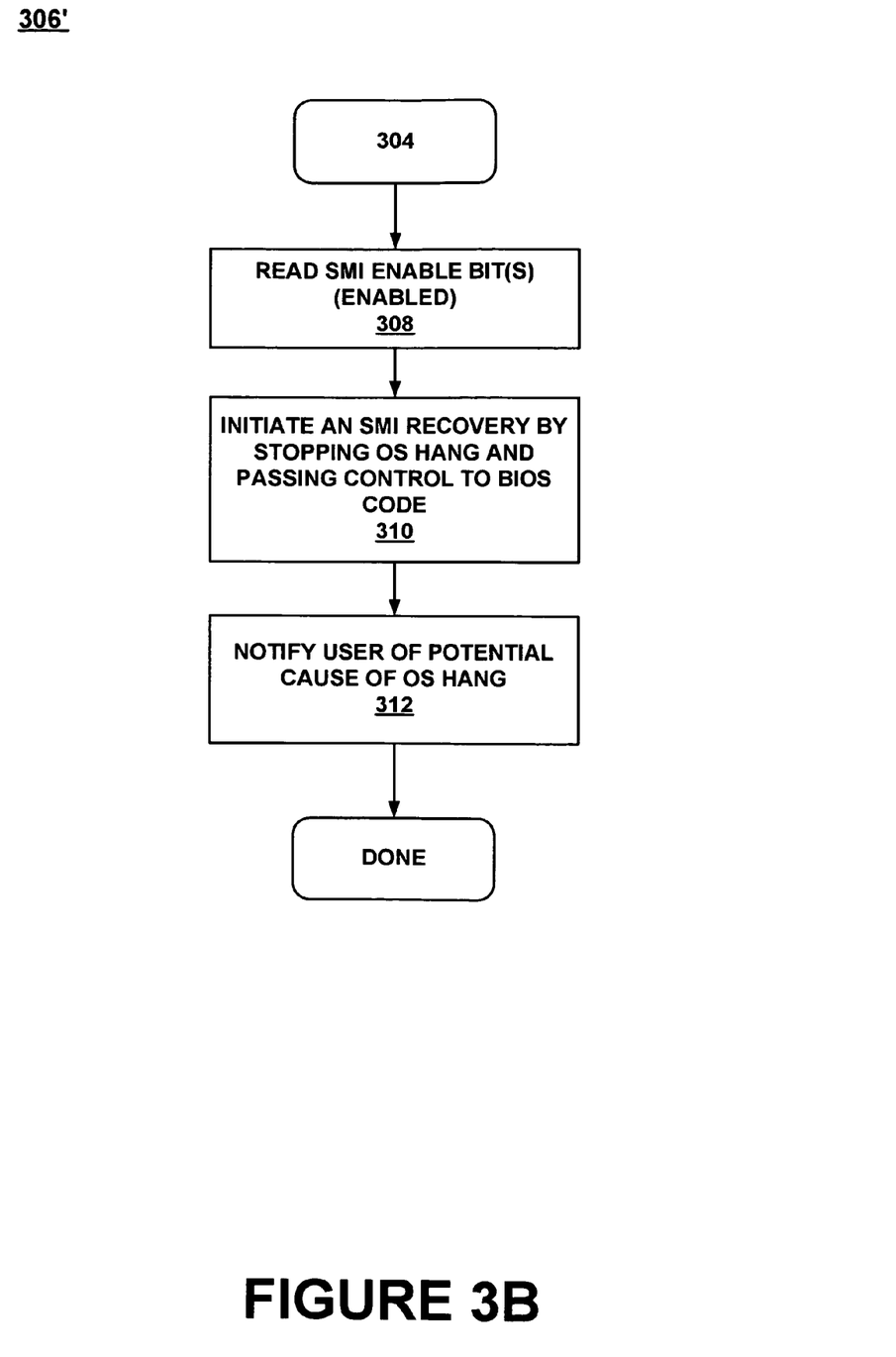
FIG. 3B illustrates one embodiment of a process in which the hang recovery process is initiated, in accordance with one embodiment of the present invention.

FIG. 3B illustrates one embodiment of a process 306' in which the hang recovery process is initiated, in accordance with one embodiment of the present invention. The method begins at operation 308 where SMI enable bits are read. If the SMI enable bits are read and determined to be enabled, the method will move to operation 310. In operation 310, an SMI recovery is initiated by stopping the OS and passing control to BIOS code. As mentioned above, the BIOS code will be provided in provided an opportunity to correct the condition that caused the OS to hang.

If correction is not possible in operation 310, the BIOS code can attempt to launch system diagnostics programs in order to fix the condition that caused the OS to hang. The method will then move to operation 312 where the user is notified (e.g., by way of a pop-up screen, a GUI screen, text screen, etc.) of the potential cause of the OS hang so as to avoid entering the hang state in the future. For instance, the BIOS code can inform the user that the potential cause for the OS hang might have been the installation of a new controller card, or other hardware to the system. Accordingly, the user will be alerted and can therefore avoid performing hardware installations that can potentially cause the OS to hang or become unstable.

Figure 3C:
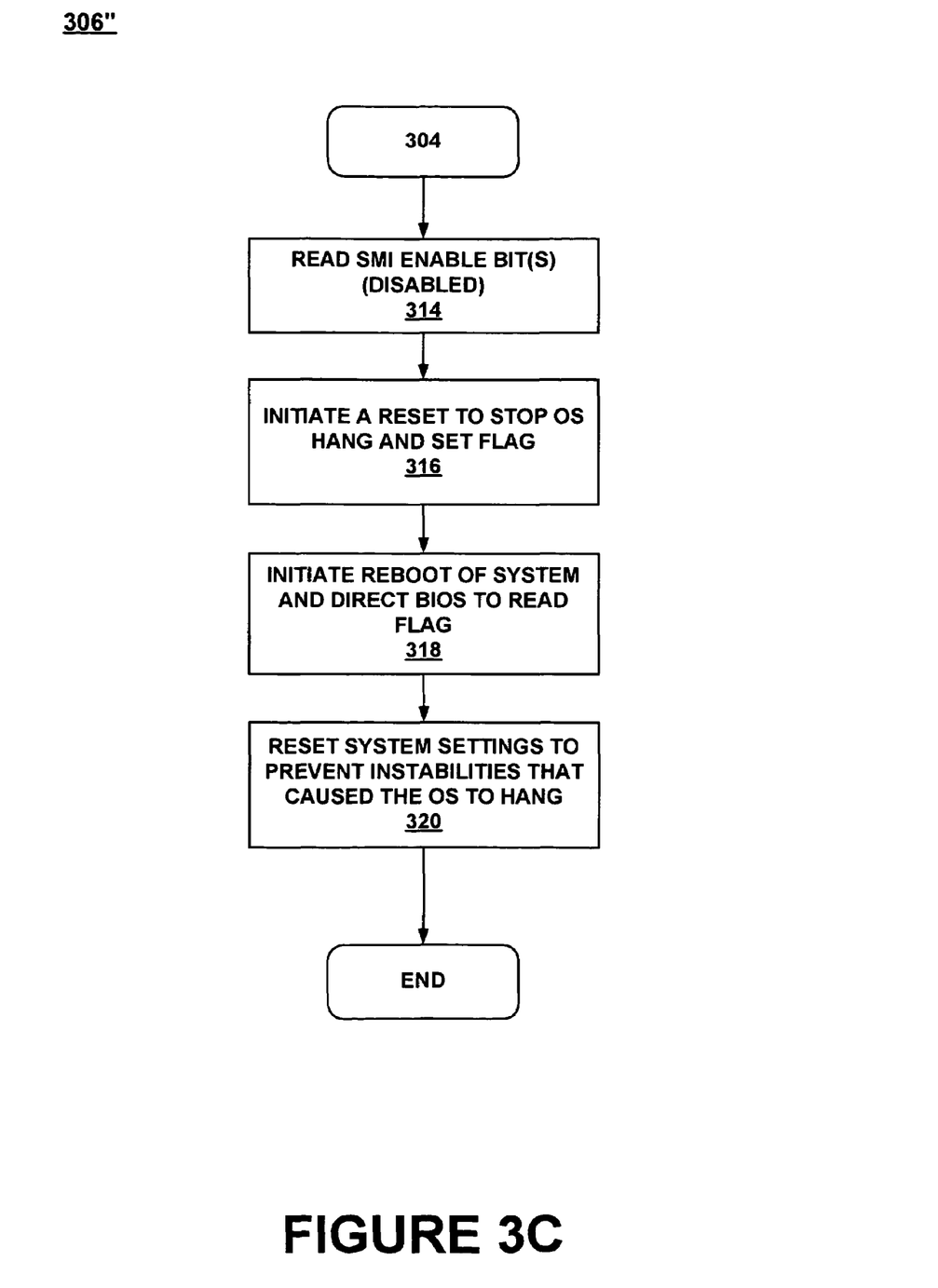
FIG. 3C illustrates another embodiment in which the operation processes hang recovery, in accordance with another embodiment of the present invention.

FIG. 3C illustrates another embodiment in which the operation 306" processes hang recovery, in accordance with another embodiment of the present invention. The method begins at an operation 314 where the SMI-enabled bits are read. If the SMI-enabled bits are not enabled (disabled), the method will move to operation 316 where a reset to stop the OS hang is initiated, and a flag is set. The method then moves to operation 318 where the system is rebooted and the BIOS is directed to read the flag.

In operation 320, the system settings are reset in response to the read flag to prevent instabilities that caused the OS to hang. For instance, the OS may have hung because the system settings had over-clocked the system, increased the voltage of the system, or other settings that caused the system to run at a higher performing state, but has the detriment of causing instability during operation in a more stressed condition. The stress condition may be the use of processor-intensive applications such as graphics applications, game applications, mathematical calculations, and the like. Accordingly, the present invention will enable recovery of an OS hang directly through system hardware (e.g., OS hang logic 107) and system software (e.g., system BIOS code).

Figure 4A:
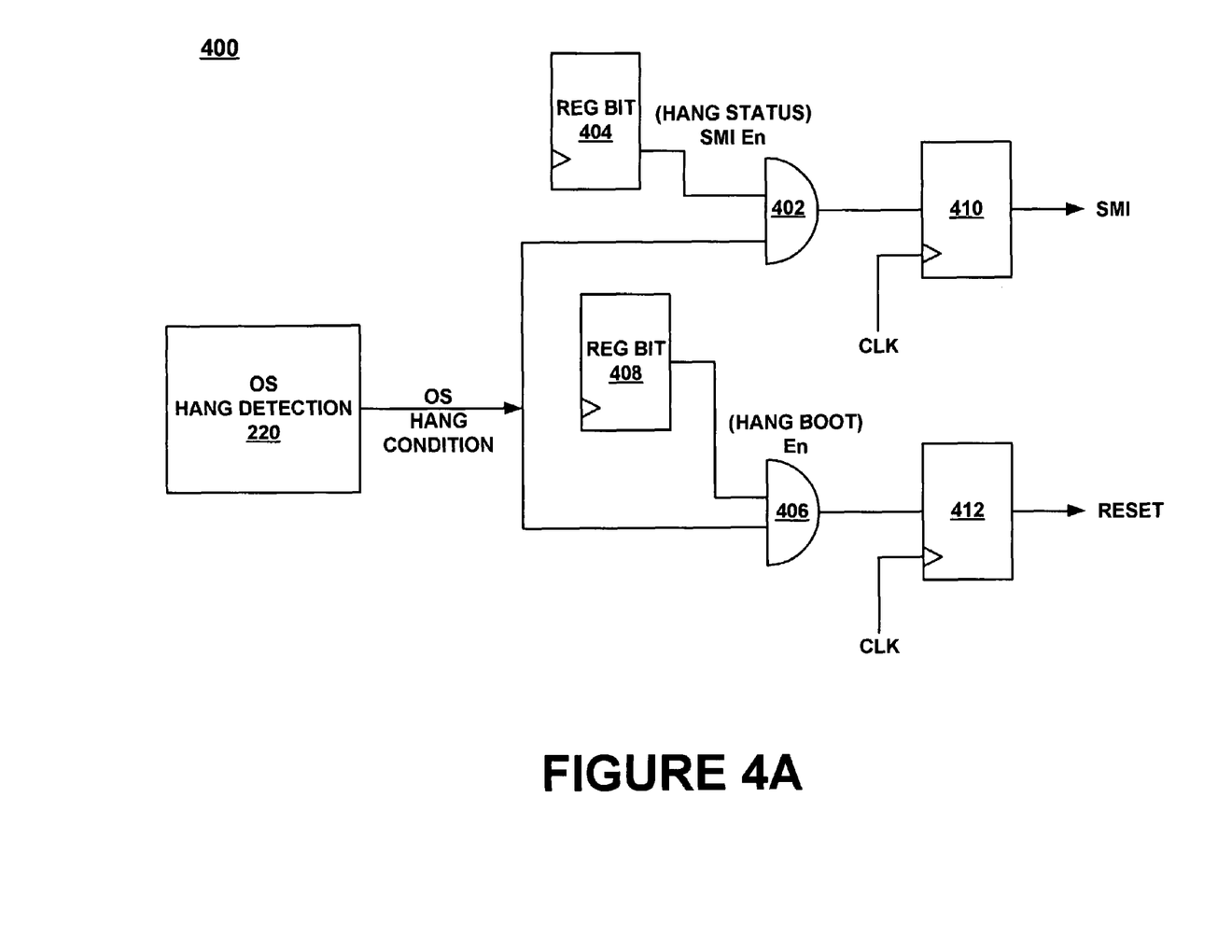
FIG. 4A illustrates a basic circuit diagram of a state where the operating system (OS) has exhibited an OS hang condition.

FIG. 4A illustrates a basic circuit diagram 400 of a state where the operating system (OS) 220 has exhibited an OS hang condition. In accordance with preset settings in registers 404 and 408, one of a hang status operation or a hang boot operation will be performed. When a hang status operation is performed, the SMI enable is passed to a gate 402 which then passes a signal to a latch 410. The signal is then passed from latch 410 as an SMI signal to the CPU 102.

In another embodiment, if the registers are set such that a hang boot operation is performed, register 408 will be set such that the SMI is not enabled, and the hang boot is enabled via gate 406. Gate 406 will then pass the signal to a latch 412 that is then passed as a reset signal to the CPU 102. In one embodiment, the circuitry is designed to initially attempt an SMI operation to thus allow the system BIOS software to fix or detect the problem without having to perform a full reset. However, if the SMI operation fails, the process can then move to more escalated measures for removing the OS from the hang condition, such as a system reset.

Figure 4B:
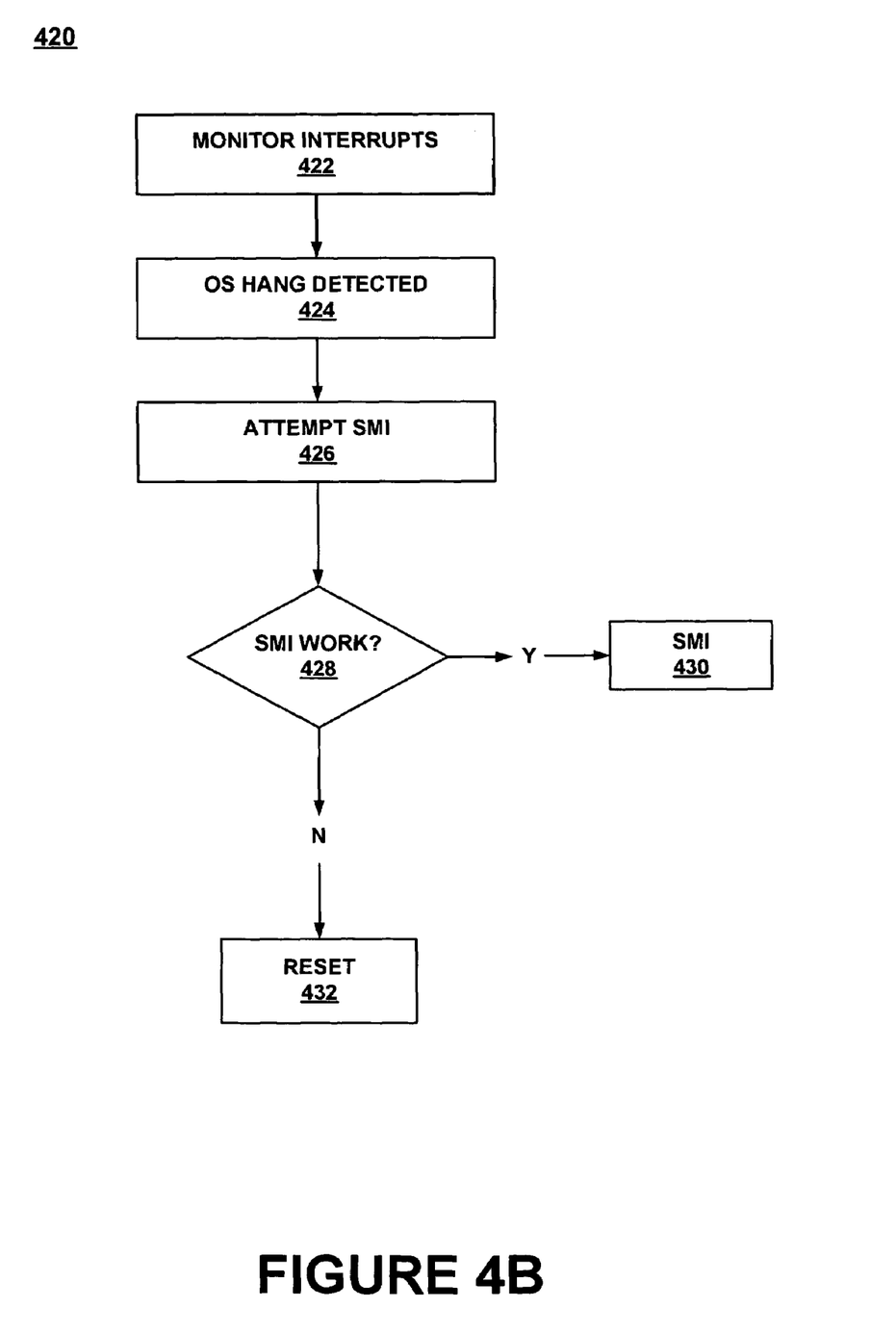
FIG. 4B illustrates a high level diagram illustrating the settings of register bits that dictate whether an SMI operation is to be performed or a reset operation is to be performed, in accordance with another embodiment of the present invention.

FIG. 4B illustrates a high level diagram 420 illustrating the settings of register bits 404 and 408 that dictate whether an SMI operation is to be performed or a reset operation is to be performed. The method begins at an operation 422 where interrupts are being monitored. In operation 424, the OS hang condition is detected by the OS hang logic 107. In operation 426, an SMI operation is attempted, and in operation 428, it is determined whether the SMI register bits have been set.

If the SMI does not have the registers set such that an SMI should be performed, the method will move to a reset operation 432. Alternatively, if the SMI is designed to work based on register settings, the operation will move to perform an SMI operation 430.

For illustration purposes, the following table shows bits that can be set and reset for controlling operation of the OS hang logic 107.

| POR | R/W | Description |
|-----|-----|-------------|
| 0 | | HANG_CNT. Hang Detect Counter control. This determines how long the INTR pin must be continuously asserted to cause an event.<br>00 = 4 sec<br>01 = 8 sec<br>10 = 16 sec<br>11 = 32 sec |
| 0 | RW1C | OSHANG_STS. OS Hang SMI status. This is set whenever the OS is determined to be hung. This is determined if the INTR pin to the CPU stays asserted with for the timeout period (4, 8, or 16 sec). |
| 0 | R/W | OSHANG_EN. OS Hang SMI enable.<br>0 = Disable SMI# generation on this event.<br>1 = Enable SMI# generation on this event. |
| 0 | R/W | OSHANG_BOOT. OS Hang boot will allow the system to automatically be reset when a Hang condition is detected. This causes a PCI_RST# sequence.<br>0 = Do not reset the system when an OS Hang is detected<br>1 = Reset the system when an OS Hang is detected |
| 0 | R/W | SAFE_MODE. OS Hang Safe Mode reboot. If this bit is set, and the system is reset due to an OS Hang (HANG_STS is set), the system will be rebooted into a safe mode of operation that will guarantee stable operation. This mode allows the user to undo a configuration that causes the system to be unstable |
| 0 | RW1C | HANG_STS. OS Hang Status. Hardware sets this bit when the Hang Counter has determined that the INTR pin has not been de-asserted during its count. |

In summary, the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Part of the invention can also be embodied as computer readable code on a computer readable medium. The computer readable medium is any data storage device that can store data which can be thereafter be read by a computer system. Examples of the computer readable medium include EEPROMs, FLASH memory, BIOS memory chips, hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. Circuitry for detecting operating system hang conditions, comprising:
   interrupt logic for receiving system interrupts targeted for a central processing unit;
   hang detection logic being in communication with the interrupt logic, the hang detection logic being capable of determining whether the central processing unit has processed an interrupt within a period of time by monitoring an interrupt pin; and
   hang resolution logic for removing the central processing unit from a hang state when it is determined that the interrupt has not been processed within the period of time.

2. The circuitry of claim 1, wherein the interrupt logic communicates the received system interrupts to the central processing unit.

3. The circuitry of claim 1, wherein the hang detection logic includes a timer for determining when the period of time expires.

4. The circuitry of claim 1, wherein the hang detection logic is in communication with the interrupt logic and the hang resolution logic.

5. The circuitry of claim 1, wherein the hang resolution logic includes reset boot logic and system management interrupt (SMI) logic, the hang detection logic being configured to attempt removing the central processing unit from the hang state through one of the reset boot logic and the SMI logic.

6. The circuitry of claim 5, wherein each of the reset boot logic and the SMI logic is in communication with the central processing unit.

7. The circuitry of claim 1, wherein the hang detection logic is integrated into a south bridge of a computer system.

8. The circuitry of claim 7, wherein the computer system further comprises a north bridge, memory, and a system basic input/output system (BIOS).

9. The circuitry of claim 8, wherein the north bridge enables communication for graphics controller cards.

10. In a computer system having a central processing unit, a north bridge, a south bridge, random access memory, and a system basic input/output system (BIOS), hang detect circuitry being integrated into the south bridge for monitoring when an operating system enters a hang state, the hang detect circuitry comprising:
   interrupt logic for handling interrupts for the computer system and communicating the received interrupts to the central processing unit;

hang detection logic for monitoring an interrupt pin and a period of time for which an interrupt to the operating system is asserted and determining when the hang state has occurred; and hang resolution logic for recovering the operating system from the hang state.

11. The hang detect circuitry as recited in claim 10, wherein the hang resolution logic includes first corrective logic for attempting recovery of the operating system from the hang state, the first corrective logic being configured to stop processing by the operating system and pass control to system BIOS code, the system BIOS code being configured to process, an attempt to fix a cause of the hang state, a notification to a user of the computer system of a potential cause for the hang state, and suggestions to the user of potential corrective settings for the computer system that can be set upon a subsequent reboot of the computer system.

12. The hang detect circuitry as recited in claim 11, wherein the first corrective logic is controlled by system management interrupt (SMI) logic, which is in communication with the central processing unit.

13. The hang detect circuitry as recited in claim 10, wherein the hang resolution logic includes second corrective logic for attempting recovery of the operating system from the hang state, the second corrective logic being configured to, set a flag being indicative of a potential cause for the hang state, and initiate a reboot of the computer system, the system BIOS being configured to read the flag and cause a reset of system settings to prevent the hang state.

14. The hang detect circuitry as recited in claim 13, wherein the second corrective logic is controlled by reset boot logic.

15. The hang detect circuitry as recited in claim 10, wherein the hang resolution logic includes reset boot logic and system management interrupt (SMI) logic, the hang detection logic being configured to recover the operating system from the hang state through one of the reset boot logic and the SMI logic.

16. The hang detect circuitry as recited in claim 10, wherein the hang detection logic includes a timer for determining when the period of time expires.

17. The hang detect circuitry as recited in claim 10, wherein the hang resolution logic is configured to initiate a system management interrupt to recover from the hang state.

18. The hang detect circuitry as recited in claim 10, wherein the hang resolution logic is configured to initiate a non-maskable interrupt to recover from the hang state.

19. The hang detect circuitry as recited in claim 10, wherein the hang resolution logic is configured to initiate a central processing unit (CPU) Init (INIT) to recover from the hang state.

20. The hang detect circuitry as recited in claim 10, wherein the hang resolution logic is configured to initiate a full system reset to recover from the hang state.

21. The hang detect circuitry as recited in claim 10, wherein the hang resolution logic is configured to command an escalating recover process.

22. The hang detect circuitry as recited in claim 21, wherein the escalating recovery process includes attempting:

(a) a system management interrupt, then (b) a non-maskable interrupt, then (c) a CPU INIT, then (d) a full system reset, until one of (a)–(d) recovers the system from the hang state.

23. A method for detecting when an operating system enters a hang state, comprising:

monitoring an interrupt pin for asserted interrupts to the operating system; and timing each interrupt to determine if the hang state has occurred.

24. The method as recited in claim 23, further comprising:

if a period of time expires without completion of an interrupt, the method further includes, initiating a recovery process to remove the operating system from the hang state.

25. The method as recited in claim 24, wherein the recovery process to remove the operating system from the hang state is an escalating process.

26. The method as recited in claim 25, wherein the escalating process includes, (a) attempting a system management interrupt, then (b) attempting a non-maskable interrupt, then (c) attempting a CPU INIT, then (d) attempting a full system reset, until one of (a)–(d) recovers the system from the hang state.

* * * * *